United States Patent [19]

Sato

[11] Patent Number: 5,042,886

[45] Date of Patent: Aug. 27, 1991

[54] METHOD FOR CONTROLLING HYDRAULIC BRAKING PRESSURE FOR A VEHICLE

[75] Inventor: Makoto Sato, Wako, Japan

[73] Assignee: Honda Giken Kogyo Kabushiki Kaisha, Tokyo, Japan

[21] Appl. No.: 522,023

[22] Filed: May 11, 1990

Related U.S. Application Data

[62] Division of Ser. No. 293,773, Jan. 5, 1989, Pat. No. 4,940,291.

[30] Foreign Application Priority Data

Jan. 7, 1988 [JP] Japan ................................. 63-1550

[51] Int. Cl.$^5$ ................................................ B60T 8/32
[52] U.S. Cl. ................................. 303/113; 303/15; 303/93; 303/117; 303/119; 303/95; 188/181 C
[58] Field of Search ............... 303/15, 117, 119, 96, 303/91, 93, 3, 94, 13, 14, 50, 95, 10–12, 180, 116, 113, 104, 101, 20, 16–18; 137/625.65; 188/161, 152, 181 C, 158–165

[56] References Cited

U.S. PATENT DOCUMENTS

| | | |
|---|---|---|
| 3,286,734 | 11/1966 | Hartshorne . |
| 3,394,967 | 7/1968 | Lucien ................... 303/93 |
| 3,514,161 | 5/1970 | Frayer . |
| 3,606,493 | 9/1971 | Schiltz et al. . |
| 3,851,930 | 12/1974 | Grosseau . |
| 3,856,362 | 12/1974 | Howard . |
| 3,880,476 | 4/1975 | Belart et al. . |
| 4,131,325 | 12/1978 | Bayliss .................. 188/181 C X |
| 4,140,352 | 2/1979 | Delpech et al. ............ 303/93 |
| 4,316,599 | 2/1982 | Bouvet et al. . |
| 4,365,847 | 12/1982 | Martin ..................... 303/93 |
| 4,404,633 | 9/1983 | Giocoechea ................ 303/93 X |
| 4,635,683 | 1/1987 | Nielsen . |
| 4,738,493 | 4/1988 | Inagaki et al. . |
| 4,838,518 | 6/1989 | Kobayashi et al. . |
| 4,940,291 | 7/1990 | Sato ...................... 303/119 X |

FOREIGN PATENT DOCUMENTS

| | | |
|---|---|---|
| 0287855 | 12/1986 | Japan .................... 303/101 |
| 62-77068 | 5/1987 | Japan . |
| 62-173363 | 7/1987 | Japan . |
| 1587405 | 4/1981 | United Kingdom . |
| 2127505A | 4/1984 | United Kingdom . |
| 2139302A | 11/1984 | United Kingdom . |
| 2169676A | 7/1986 | United Kingdom . |
| 2196078A | 4/1988 | United Kingdom . |
| 2205134A | 11/1988 | United Kingdom . |

Primary Examiner—Douglas C. Butler
Attorney, Agent, or Firm—Armstrong, Nikaido, Marmelstein, Kubovcik, & Murray

[57] ABSTRACT

A method of controlling a braking hydraulic braking pressure for a vehicle wherein a reference deceleration is set corresponding to an amount of braking operation, a standard hydraulic braking pressure is determined corresponding to the reference deceleration and an amount of electricity corresponding to the standard hydraulic braking pressure is applied to an actuator so as to allow the hydraulic braking pressure to be fed to a braking unit in dependence on the amount of electricity applied thereto so that ideal control for the hydraulic braking pressure is performed in correspondence to the quantity of braking operation. An apparatus for controlling a hydraulic braking pressure for a vehicle wherein its structure is simplified so as to carry out the aforementioned method. The apparatus is so constructed that a spool adapted to change over a communicated state between output port, input port and release port in dependence on an axial displacement thereof is slidably fitted in a housing having input ports leading to the hydraulic pressure supply source, output ports leading to braking units and release port leading to an oil tank, an actuator adapted to generate a thrust force in dependence on an amount of electricity input thereinto is operatively connected to one ends of the spools and a hydraulic pressure chamber leading to the output port is formed in the housing to generate hydraulic force adapted to counteract against a thrust force while it is exposed to the other end face of the spool.

10 Claims, 8 Drawing Sheets

5,042,886

METHOD FOR CONTROLLING HYDRAULIC BRAKING PRESSURE FOR A VEHICLE

BACKGROUND OF THE INVENTION

1. Field of the Invention

The present invention relates to a method and an apparatus for controlling a hydraulic braking pressure for a vehicle.

2. Prior Art

Hitherto, hydraulic braking pressure usable for a vehicle is controlled such that hydraulic pressure output from a master cylinder in dependence on an extent of depression of a brake pedal is fed to brake units via a hydraulic type hydraulic braking pressure controlling apparatus, as disclosed, e.g. in an official gazette of Japanese Laid-Open Utility Model No. 77068/1987.

However, the above mentioned conventional apparatus has drawbacks because it is complicated in structure and precise control can only be achieved with a lot of difficulty.

SUMMARY OF THE INVENTION

The present invention has been made with the foregoing background in mind and its object resides in providing a method and an apparatus for controlling hydraulic braking pressure for a vehicle of which the structure is simplified by controlling the hydraulic braking pressure under electrical control and which makes it possible to perform precise control for the hydraulic braking pressure.

To accomplish the above object, according to a method of the present invention a reference deceleration is set in dependence on a quantity of braking operation, a standard braking hydraulic pressure is determined corresponding to the reference deceleration, and an amount of electricity corresponding to the standard hydraulic braking pressure is applied to an actuator adapted to be actuated so as to supply the hydraulic braking pressure to a braking unit in dependence on the amount of applied electricity. The method of the invention makes it possible to perform ideal controlling for the hydraulic braking pressure in correspondence to the quantity of braking operation by using an electric circuit and moreover it assures that the maximum braking efficiency can be obtained.

In addition, according to an apparatus of the present invention, a spool adapted to shift a communicated state between an output port, an input port and a release port in dependence on its axial displacement is slidably fitted in a housing having the input port leading to a hydraulic pressure supply source, the output port leading to a braking unit and release port to an oil tank, an actuator adapted to generate a thrust force in dependence on an amount of input electricity is operatively connected to one end of the spool, and a hydraulic pressure chamber leading to the output port is formed in the housing to generate a hydraulic force adapted to counteract the thrust force, the hydraulic pressure chamber being exposed to the other end face of the spool. With this construction, the hydraulic braking pressure to be fed to braking units is controlled in proportion to the amount of electricity to be input into the respective actuators whereby more precise control can be performed merely by the simple structure.

These and other objects, features and advantages of the present invention will become readily apparent from reading the following description in conjunction with the accompanying drawings.

BRIEF DESCRIPTION OF THE DRAWINGS

FIG. 1 is a view illustrating a hydraulic circuit for controlling hydraulic pressure.

FIG. 2 is a characteristic diagram for a linear solenoid.

FIG. 3 is an electrical control circuit diagram.

FIG. 4 is a reference deceleration setting diagram.

FIG. 5 is a standard hydraulic braking pressure setting diagram.

FIG. 6 is a front wheel side standard voltage setting diagram.

FIG. 7 is a rear wheel side standard voltage setting diagram.

FIG. 8 is a diagram illustrating, by way of example, a compensation voltage attributable to deviation of the current deceleration from the reference deceleration.

FIG. 9 is a diagram illustrating by way of example a control voltage required for anti-lock control.

DESCRIPTION OF THE PREFERRED EMBODIMENTS

The present invention will now be described in greater detail hereinafter with reference to the accompanying drawings which illustrate preferred embodiments thereof.

Figure 1:
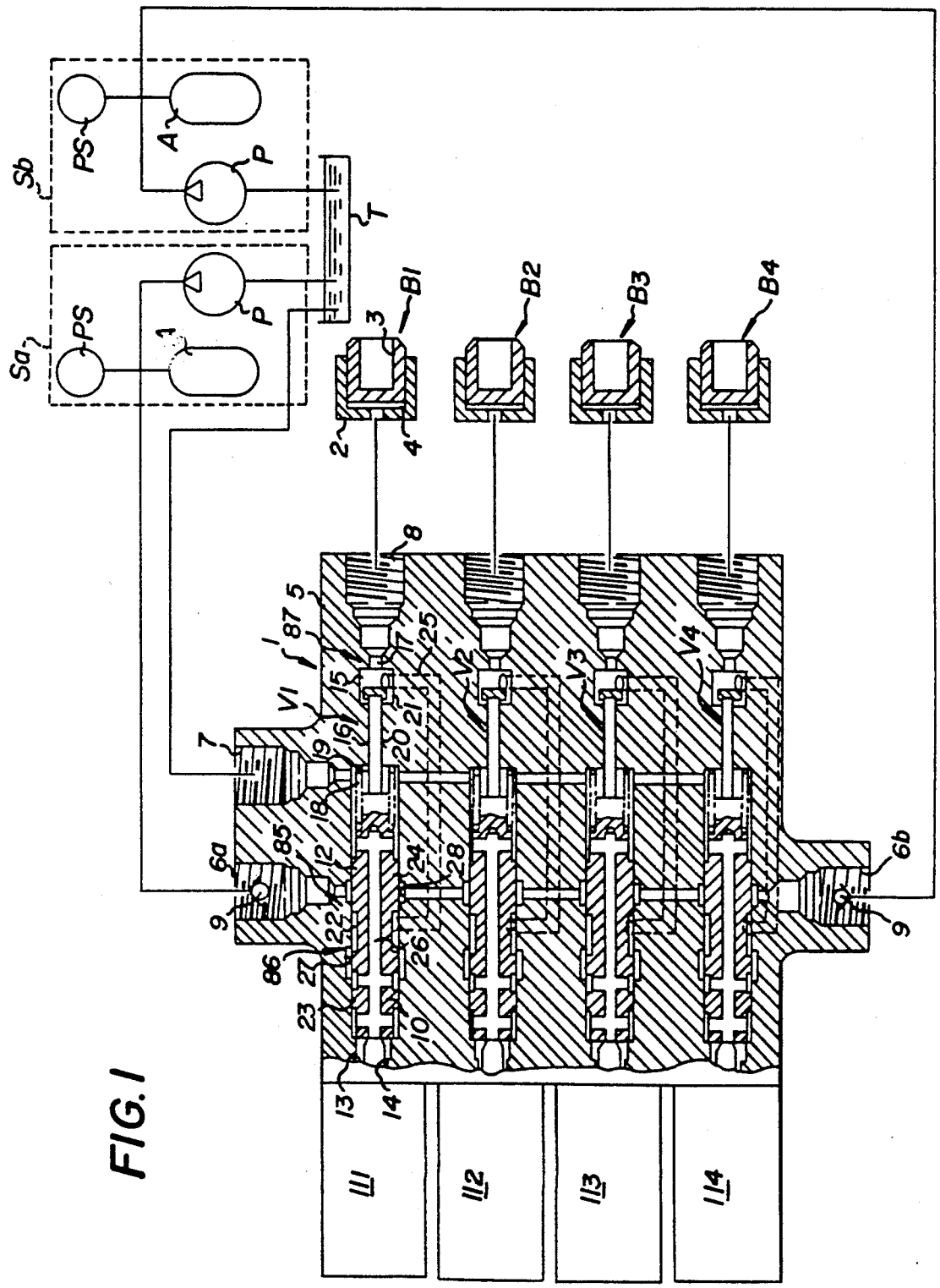
FIGS. 1 to 9 illustrate an apparatus in accordance with a first embodiment of the present invention.

Referring first to FIG. 1 which illustrates a first embodiment of the present invention, a hydraulic braking pressure controlling apparatus 1 is provided between a group of braking units comprising a braking unit $B_1$ for a left front wheel, a braking unit $B_2$ for a right front wheel, a braking unit $B_3$ for a left rear wheel and a braking unit $B_4$ for a right rear wheel, and a group of first and second hydraulic pressure supply sources $S_a$ and $S_b$ so as to allow the hydraulic braking pressure to be transmitted to the respective braking units $B_1$, $B_2$, $B_3$ and $B_4$ by the operation of the apparatus 1.

Each of the braking units $B_1$, $B_2$, $B_3$ and $B_4$ includes a cylinder 2 and a piston 3 slidably fitted in the cylinder 2 so that a braking force is generated by displacement of the piston 3 corresponding to the hydraulic braking pressure introduced into a hydraulic braking pressure chamber 4 which is defined between the cylinder 2 and the piston 3.

The first and second hydraulic pressure supply sources $S_a$ and $S_b$ are basically identical in structure and each includes a hydraulic pump P for sucking up working oil from an oil tank T, an accumulator A hydraulically connected to the hydraulic pump P and a pressure switch PS for controlling operation of the hydraulic pump P.

The apparatus 1 comprises valve mechanism $V_1$, $V_2$, $V_3$ and $V_4$ separately corresponding to the braking units $B_1$, $B_2$ $B_3$ and $B_4$ arranged in parallel with each other in a side-by-side relationship in a common housing 5. The respective valve mechanisms $V_1$, $V_2$, $V_3$ and $V_4$ are basically identical in structure. Accordingly, description will be made in more details below only with respect to the structure of the valve mechanism $V_1$.

The housing 5 is formed with first and second input ports 6a and 6b separately communicated with the first and second hydraulic pressure supply sources Sa and Sb, a release port 7 communicated with the oil tank T and four output ports 8 separately communicated with a braking hydraulic pressure chamber 4 of each of the braking units $B_1$, $B_2$, $B_3$ and $B_4$. The first and second input ports 6a and 6b are hydraulically connected to the first and second hydraulic pressure supply sources Sa and Sb via check valves 9 adapted to permit flowing of working oil only from the first and second hydraulic pressure supply sources Sa and Sb.

The valve mechanism $V_1$ includes a spool 10 slidably received in the housing 5 and a linear solenoid $11_1$ secured to the housing 5 to serve as an actuator for biasing the spool 10 in the axial direction. The spool 10 is adapted to change the operative state of a first valve 85 as well as the operative state of a second valve 86 in dependence on variation of their positions as viewed in the axial direction attributable to a relationship between a magnitude of thrust force given by the linear solenoid $11_1$ to be exerted on the one end of the spool 10 and an intensity of hydraulic pressure active on the other end of the same as viewed in the axial direction, while the first valve 85 is for changing over the connection and disconnection between the first and second input ports 6a and 6b and the output port 8, and the second valve 86 is for changing over the connection and disconnection between the output port 8 and the release port 7.

The housing 5 has a cylinder bore 12 formed coaxially relative to the axis line of the output port 8 so that the spool 10 is slidably received in the cylinder bore 12. The linear solenoid $11_1$ is attached to the one side wall of the housing 5 and its driving rod 13 is inserted into the cylinder bore 12 through an insert hole 14 provided in the one end of the cylinder bore 12. In addition, a hydraulic pressure chamber 15 having a diameter smaller than that of the cylinder bore 12 is provided in the housing 5 coaxially with the bore 12 at a region between the cylinder bore 12 and the output port 8 opened on the other outer side wall of the housing 5. Further, the housing 5 is formed with a slide hole 16 through which the cylinder bore 12 is coaxially connected to the hydraulic pressure chamber 15 and a communication hole 17 through which the hydraulic pressure chamber 15 is coaxially connected to the output port 8. The slide hole 16 and the communication hole 17 are formed so as to have diameters smaller than that of the hydraulic pressure chamber 15, respectively.

The foremost end of the driving rod 13 of the solenoid $11_1$ comes in coaxial contact with the one end of the spool 10 slidably fitted int he cylinder bore 12. A spring chamber 18 communicated with the release port 7 is defined between the other end of the spool 10 and the housing 5 so that a return spring 19 for biasing the spool 10 toward one end in its axial direction, i.e., toward the linear solenoid $11_1$ side is accommodated in the spring chamber 18. This causes the driving rod 13 to be normally brought in contact with the one end of the spool 10 whereby the spool 10 is operatively connected to the linear solenoid $11_1$.

The base end of a shaft portion 20 of which foremost end is oil-tightly and slidably protruded into the interior of the hydraulic pressure chamber 15 through the slide hole 16 is integrally and coaxially connected to the other end of the spool 10. A disc-shaped valve member 21 adapted to close the communication hole 17 by allowing it to contact the wall surface of the hydraulic pressure chamber 15 on the communication hole 17 side is secured to the foremost end of the shaft portion 20 which has been protruded into the interior of the hydraulic pressure chamber 15. The valve member 21 constitutes a third valve 87 in cooperation with the communication hole 17, the third valve 87 is for changing over the connection and disconnection between the hydraulic pressure chamber 15 and the braking unit $B_1$. When the spool 10 is displaced to the maximum degree toward the hydraulic pressure chamber 15 side to close the communication hole 17 with the valve member 21, feeding of working oil from the hydraulic pressure chamber 15 to the braking unit $B_1$ is interrupted. When the valve member 21 is located at a position where the communication hole 17 is kept opened, hydraulic force generated by hydraulic pressure in the hydraulic pressure chamber 15, i.e., in the hydraulic braking pressure chamber 4 is exerted on the shaft portion 20 in the one axial direction so that hydraulic force generated by hydraulic pressure in the hydraulic braking pressure chamber 4 to be active in the one axial direction and thrust force given by the linear solenoid $11_1$ to be active in the other axial direction are exerted on the spool 10.

The spool 10 is provided with lands 23 and 24 to form an annular groove 22 therebetween and the housing 5 has a communication passage 25 formed therein by way of which the annular groove 22 is communicated with the hydraulic pressure chamber 15 irrespective of any position assumed by the spool 10 in the axial direction. Additionally, the spool 10 has a passage 26 formed therein which is opened on the outer surface of the middle part of the land 23 located on the one axial side, i.e., on the linear solenoid $11_1$ side and this passage 26 is normally communicated with the spring chamber 18. Moreover, an annular recess 27 by way of which the passage 26 can be communicated with the annular groove 22 and an annular recess 28 which can be communicated with the first and second input ports 6a and 6b as well as the annular recess 22 are provided in an axially spaced relationship on the inner wall of the cylinder bore 12. Indeed, the first valve 85 comprises the annular groove 22 on the spool 10 and the annular recess 28 in the housing 5, while the second valve 86 comprises the annular groove 22 on the spool 10 and the annular recess 27 in the housing 5. When the spool 10 is located at a position where the passage 26 is communicated with the annular groove 22 via the annular recess 27, i.e., when the second valve 86 is opened, the annular recess 28 is closed with the land 24 and thereby the first valve 85 is kept closed. Then, when the spool 10 is displaced from the foregoing state toward the other axial side so as to allow the annular recess 28 to be communicated with the annular groove 22 to open the first valve 85, communication between the passage 26 and the annular groove 22 is interrupted by means of the land 23 so that the second valve 86 is kept closed.

Namely, a hydraulic pressure releasing position of the spool 10 on the linear solenoid $11_1$ side where the second valve 86 is opened and the first valve 85 is closed and a hydraulic pressure supplying position of the spool 10 on the hydraulic pressure chamber 15 side where the first valve 85 is opened and the second valve 86 is closed are determined. When the spool 10 is located at the hydraulic pressure supplying position, the annular groove 22 which is communicated with the hydraulic braking pressure chamber 4 via the output port 8, the communication hole 17 and the communication passage 25 become communicated with the annular recess 28 which is communicated with the input ports 6a and 6b so that hydraulic pressure is fed to the braking hydraulic pressure chamber 4 from the first and second hydraulic pressure supply sources Sa and Sb. On the other hand, when the spool 10 is located at the hydraulic pressure releasing position, the passage 26 which is communicated with the release port 7 via the spring chamber 18 becomes communicated with the annular groove 22 so that the braking hydraulic pressure chamber 4 becomes communicated with the oil tank T. Additionally, when the spool 10 is located at an intermediate position between the hydraulic pressure releasing position and the hydraulic pressure supplying position, both the first and second valves 85 and 86 are kept closed. It should be noted that thrust force given by the linear solenoid $11_1$ to be exerted on the one axial end of the spool 10 is active toward the hydraulic pressure supplying position and hydraulic force generated by hydraulic pressure in the hydraulic pressure chamber 15 to be exerted on the other axial end of the spool 10 is active toward the hydraulic pressure releasing position.

Figure 2:
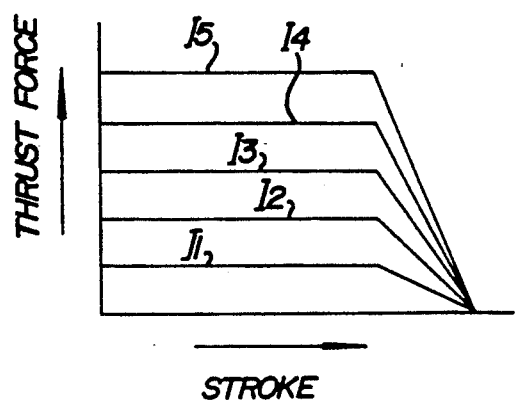

Here, as shown in FIG. 2, the linear solenoid $11_1$ generates thrust force corresponding to a voltage appearing when amounts $I_1$ to $I_5$ of exciting electric current or resistance are determined constant. Thrust force F generated by the linear solenoid $11_1$ within a certain range of stroke is represented by a formula of $F=K \cdot I$ where an amount of exciting electric current is identified by I and a constant is identified by K. In addition, hydraulic force f exerted on the spool 10 is represented by a formula of $f=Sc \cdot Pw$ where hydraulic pressure in the hydraulic pressure chamber 15, i.e., hydraulic pressure in the braking hydraulic pressure chamber 5 is identified by Pw and pressure receiving area on the shaft portion 20 exposed to the hydraulic pressure chamber 15 is identified by Sc. Consequently, when an expression of $F+K \cdot I > Sc \cdot Pw$ is established, the spool 10 is displaced to the right-hand hydraulic pressure supplying position. On the other hand, when an expression of $F=K \cdot I < Sc \cdot Pw$ is established, the spool is displaced to the left-hand hydraulic pressure releasing position.

Since the spool 10 is displaced in the axial direction in dependence on a relationship between thrust force F and hydraulic force f in terms of their intensity in the above-described manner, hydraulic pressure is introduced into the braking hydraulic pressure chamber 4 from the first and second hydraulic pressure supply sources Sa and Sb or hydraulic pressure is released from the braking hydraulic pressure chamber 4. Thus, the hydraulic pressure Pw is given by the following formula.

$$Pw = (K/Sc) \cdot I \qquad (1)$$

Namely, hydraulic pressure Pw is in proportion to electric current I to be supplied to the linear solenoid $11_1$. Thus, the hydraulic pressure Pw in the braking hydraulic pressure chamber 4 can be controlled as required by the electric current I to be supplied to the linear solenoid $11_1$.

It should be noted that other valve mechanisms $V_2$, $V_3$ and $V_4$ are basically identical to the aforementioned valve mechanism $V_1$ in structure and they are separately provided with linear solenoids $11_2$, $11_3$ and $11_4$.

There may occur a case where working oil can not be supplied from one of the first and second hydraulic pressure supply sources Sa and Sb due to some failure or trouble with the hydraulic pump P or the like. In this case, since working oil is continuously supplied from the other one of the supply sources Sa and Sb, the respective valve mechanisms $V_1$, $V_2$, $V_3$ and $V_4$ can operate normally and thereby braking operation of the respective braking units $B_1$, $B_2$, $B_3$ and $B_4$ can be maintained without interruption.

Further, when it is assumed that some hydraulic failure or trouble takes place with the braking unit $B_1$ itself or a piping system extending from the output port 8 to the braking unit $B_1$, the spool 10 is displaced to its right end by the linear solenoid $11_1$ in response to reduction of hydraulic pressure in the hydraulic pressure chamber 15, causing the communication hole 17 to be closed with the valve member 21. Consequently, other valve mechanisms $V_2$, $V_3$ and $V_4$ are not adversely affected by the above-mentioned hydraulic failure or trouble and thereby normal operation of the respective braking units $B_2$, $B_3$ and $B_4$ can be maintained further.

Figure 3:
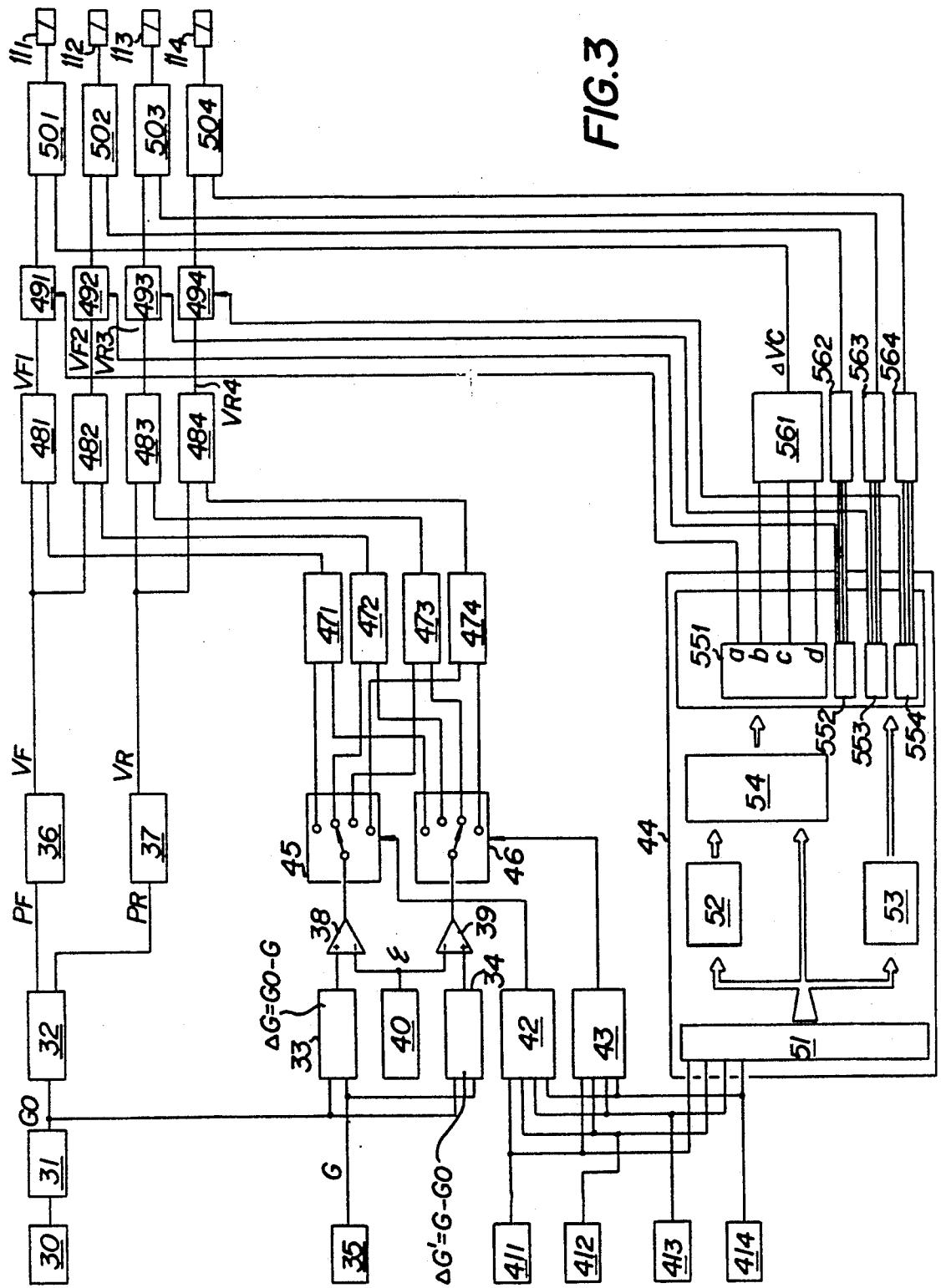

Next, description would be made with reference to FIG. 3 as to a control circuit for controlling an amount of electricity to be fed to each of the linear solenoids $11_1$ to $11_4$. However, in view of the fact that the linear solenoids $11_1$ to $11_4$ have a constant resistance, respectively, description will be practically made below as to the structure of a control circuit for controlling voltage in place of electric current.

Figure 4:
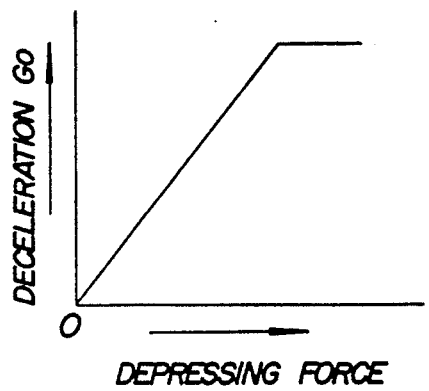

A quantity of controlling operation, that is, a signal detected by a depressing force detecting sensor 30 for detecting an intensity of depressing force exerted on a brake pedal (not shown) is input into a reference deceleration setting circuit 31. As shown in FIG. 4, a reference deceleration Go is previously set in the reference deceleration setting circuit 31 corresponding to the current depressing force so that the reference deceleration Go corresponding to the input signal transmitted from the depressing force detector sensor 30 is output. Then the reference deceleration Go is in a standard braking force setting circuit 32 as well as subtraction circuits 33 and 34.

Figure 5:
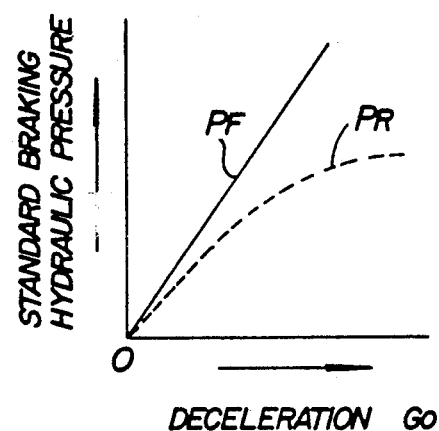
Figure 6:
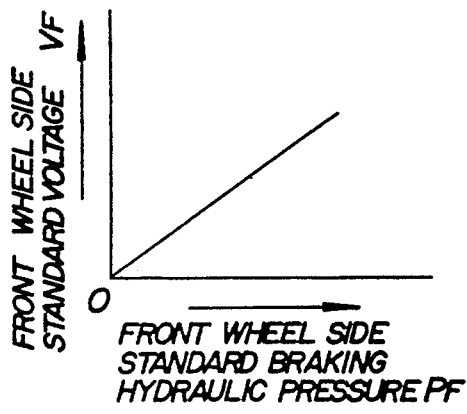
Figure 7:
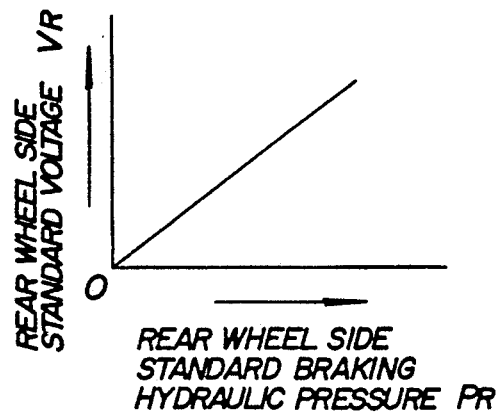

As shown in FIG. 5, a front wheel side standard braking pressure $P_F$ and a rear wheel side standard braking pressure $P_R$ are set in the standard braking force setting circuit 32 corresponding to the reference deceleration Go. In practice, these standard braking pressure $P_F$ and $P_R$ are set such that a locking point for the front wheels substantially coincides with that for the rear wheels. The front wheel side standard braking pressure $P_F$ output from the standard braking force setting circuit 32 is input into a front wheel side voltage setting circuit 36, while the rear wheel side standard braking pressure $P_R$ is input into a rear wheel side standard voltage setting circuit 37. As shown in FIG. 6, a front wheel side standard voltage $V_P$ is set in the front wheel side standard voltage setting circuit 36 corresponding to the front wheel side standard braking force $P_F$. Additionally, as shown in FIG. 7, a rear wheel side standard voltage $V_R$ is set in the rear wheel side standard voltage setting circuit 37 corresponding to the rear wheel side standard braking force $P_R$.

On the other and, a deceleration G of the vehicle detected by the deceleration sensor 35 is input in the subtraction circuits 33 and 34 so that the one subtraction circuit 33 performs calculation for a formula represented by $\Delta G + Go - G$ and the other subtraction circuit 34 does so for a formula represented by $\Delta G' = G - Go$. An output $\Delta G$ from the one subtraction circuit 33 is input into a non-inverted input terminal of a comparison circuit 38, while an output $\Delta G'$ from the other subtraction circuit 34 is input into a non-inverted input terminal of a comparison circuit 39. In addition, an output $\epsilon$ from a reference value generating circuit 40 in which an allowable deviation is input into the inverted input terminals of both the comparison circuits 38 and 39. When the outputs $\Delta G$ and $\Delta G'$ are in excess of the allowable deviation $\epsilon$, a high level of signal is output from each of the comparison circuits 38 and 39.

Values detected by a wheel speed sensor $41_1$ for detecting a speed of the left front wheel of the vehicle, a wheel speed sensor $41_2$ for the right front wheel, a wheel speed sensor $41_3$ for the left rear wheel and a wheel speed sensor $41_4$ for the right rear wheel are input into a highest speed wheel discriminating circuit 42, a lowest speed wheel discriminating circuit 43 and an anti-lock controlling circuit 44, respectively. The highest speed wheel discriminating circuit 42 discriminates which wheel has a highest running speed and the lowest speed wheel discriminating circuit 43 discriminates which wheel has a lowest speed. The comparison circuit 38 is connected to a switching circuit 45 adapted to vary a switching pattern based on results derived from discrimination conducted by the highest speed wheel discriminating circuit 42, while the comparison circuit 39 is connected to a switching circuit 46 adapted to vary a switching pattern based on results derived from discrimination conducted by the lowest speed wheel discriminating circuit 43.

The one switching circuit 45 is disposed between the comparison circuit 38 and a plurality of function generators $47_1$, $47_2$, $47_3$ and $47_4$ individually corresponding to the left front wheel the right front wheel, the left rear wheel and the right rear wheel so as to perform switching operation for allowing one of the function generators $47_1$, $47_2$, $47_3$ and $47_4$ corresponding to the wheel discriminated by the highest speed wheel discriminating circuit 42 to be connected to the comparison circuit 38. Additionally, the other switching circuit 46 is disposed between the comparison circuit 39 and the function generators $47_1$, $47_2$, $47_3$ and $47_4$ so as to perform switching operation for allowing one of the function generators $47_1$, $47_2$, $47_3$ and $47_4$ corresponding to the wheel discriminated by the lowest speed wheel discriminating circuit 43 to be connected to the comparison circuit 39.

Figure 8:
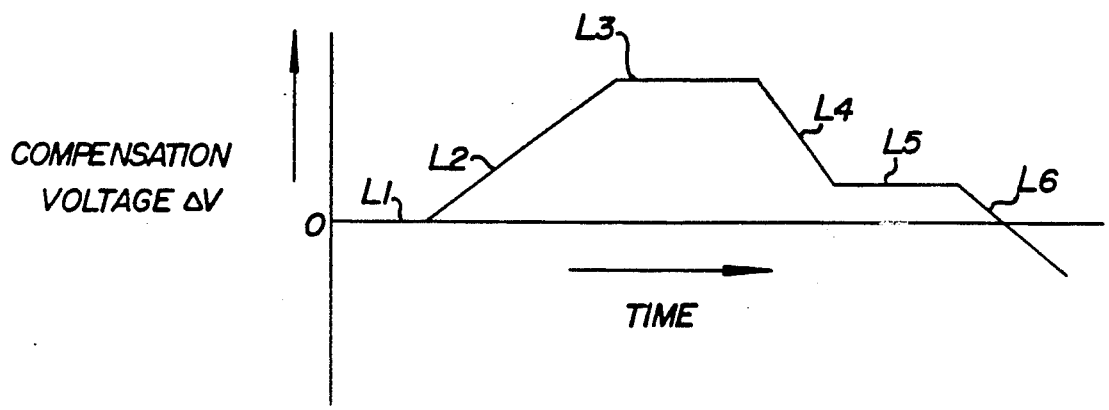

The respective function generators $47_1$, $47_2$, $47_3$ and $47_4$ are adapted to output a compensation voltage $\Delta V$ as shown in FIG. 8, when they are connected to one of the comparison circuits 38 and 39 by the switching operations performed of the switching circuits 45 and 46, and lines indicative of the compensation voltage $\Delta V$ shown in FIG. 8 are generated under the following conditions. Specifically, when a formula represented by $\Delta G = Go - G \leq \epsilon$ is established and an output from the comparison circuit 38 remains at a low level or when a formula represented by $\Delta G' = G - Go \leq \epsilon$ is established and an output from the comparison circuit 39 remains at a low level, compensation voltage $\Delta V$ is kept constant, as represented by lines $L_1$, $L_3$ and $L_5$. When a formula represented by $\Delta G = Go - G > \epsilon$ is established and an output from the comparison circuit 38 remains at a high level, compensation voltage $\Delta V$ which increases at a constant rate as time elapses is output, as represented by a line $L_2$. Additionally, when a formula represented by $\Delta G' = G - Go > \epsilon$ is established and an output from the comparison circuit 39 remains at a high level, compensation voltage $\Delta V$ which decreases at a constant rate as time elapses is output, as represented by lines $L_4$ and $L_6$.

The function generators $47_1$, $47_2$, $47_3$ $_{and}$ $47_4$ are separately connected to calculating circuits $48_1$, $48_2$, $48_3$ and $48_4$. On the other hand, the front wheel side standard voltage setting circuit 36 is connected to the calculating circuits $48_1$ and $48_2$, while the rear wheel side standard voltage setting circuit 38 is connected to the calculating circuits $48_3$ and $48_4$. Calculations for formulas represented by $V_{F1} = V_F + \Delta V$ and $V_{F2} = V_F + \Delta V$ are performed in the calculating circuits $48_1$ and $48_2$ so as to compensate standard voltage $V_F$ output from the front wheel side standard voltage setting circuit 36 with compensation voltage $\Delta V$ input from the function generators $47_1$ and $47_2$. In addition, calculations for formulas represented by $V_{R3} = V_R + \Delta V$ and $V_{R4} = V_R + \Delta V$ are performed in the calculating circuits $48_3$ and $48_4$ so as to compensate rear wheel side standard voltage $V_R$ with compensation voltage $\Delta V$ from the function generators $47_3$ and $47_4$.

Voltages $V_{F1}$, $V_{F2}$, $V_{R3}$ and $V_{R4}$ output from the calculating circuits $48_1$ to $48_4$ are input into holding circuits $49_1$ to $49_4$. The respective holding circuits $49_1$ to $49_4$ have such a function that when a signal indicative of an anti-lock operative state is input from the anti-lock controlling circuit 44, input voltages $V_{F1}$, $V_{F2}$, $V_{R3}$ and $V_{R4}$ transmitted from the calculating circuits $48_1$ to $48_4$ at this time are kept fixed so as to permit them to be input into next calculating circuits $50_1$ to $50_4$. If it is not in the anti-lock operative state, voltages $V_{F1}$, $V_{F2}$, $V_{R3}$ and $V_{R4}$ from the calculating circuits $48_1$ to $48_4$ bypass the holding circuits $49_1$ to $49_4$ so as to allow them to be input into the calculating circuits $50_1$ to $50_4$.

The anti-lock controlling circuit 44 comprises an interface circuit 51 connected to the wheel speed sensor $41_1$ to $41_4$, a wheel speed estimating circuit 52 for estimating a running speed of the vehicle based on the current speeds of the respective wheels, an acceleration and deceleration discriminating circuit 53 for discriminating whether the respective wheels are accelerated or decelerated, a slip rate determining circuit 54 for determining a slip rate for the respective wheels based on the estimated vehicle running speed and the current speed of the respective wheels and control signal generating circuits $55_1$ to $55_4$ for controlling hydraulic braking pressures in the braking units $B_1$ to $B_4$ based on the slip rate and acceleration or deceleration of the respective wheels.

Each of the respective control signal generating circuits $55_1$ to $55_4$ is provided with four output terminals a, b, c and d, the output terminals a of the control signal generating circuits $55_1$ to $55_4$ are separately connected to the holding circuits $49_1$ to $49_4$ and the output terminals b, c and d of the respective control signal generating circuits $55_1$ to $55_4$ are separately connected to function generators $56_1$ to $56_4$. A signal indicative of an anti-lock operative state is output from the respective output terminals a so that the holding circuits $49_1$ to $49_4$ are operated in response to signals from the output terminals a.

Figure 9:
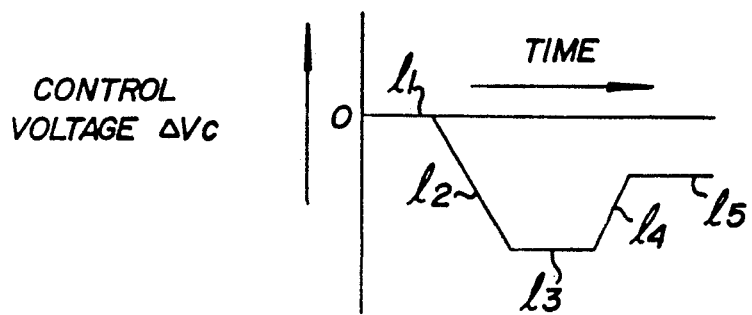

Each of the output terminals b is a terminal for outputting a signal for the purpose of reducing a hydraulic braking pressure, each of the output terminals c is a terminal for outputting a signal for the purpose of holding the hydraulic braking pressure, each of the output terminals d is a terminal for outputting a signal for the purpose of increasing the hydraulic braking pressure and the function generators $56_1$ to $56_4$ are adapted to output a control voltage $\Delta Vc$ as shown in FIG. 9 in response to signals input from the output terminals b, c and d. Specifically, from the respective function generators $56_1$ to $56_4$, when a signal for holding the hydraulic braking pressure is input from the output terminal c, a control voltage $\Delta Vc$ which remains in a constant state as represented by lines $l_1$, $l_3$ and $l_5$ irrespective of time elapse is output; when a signal for reducing the hydraulic braking pressure is input from the output terminal b, a control voltage $\Delta Vc$ which decreases at a given rate as time elapses as represented by a line $l_2$ is output; and when a signal for increasing the hydraulic braking pressure is output from the output terminal d, a control voltage $\Delta Vc$ which increases at a given rate as time elapses as represented by a line $l_4$ is output from the same.

The function generators $56_1$ to $56_4$ are separately connected to calculating circuits $50_1$ to $50_4$ so that calculations for compensating with the control voltage $\Delta Vc$ voltages $V_{F1}$, $V_{F2}$, $V_{R3}$ and $V_{R4}$ which have been input via the holding circuits $49_1$ to $49_4$ are performed in the calculating circuits $50_1$ to $50_4$. Namely, calculations as represented by formulas of $V_{F1}+\Delta Vc$, $V_{F2}+\Delta Vc$, $V_{R3}+\Delta Vc$ and $V_{R4}+\Delta Vc$ are performed in the calculating circuits $50_1$ to $50_4$. Indeed, the calculating circuits $50_1$ to $50_4$ are separately connected to the linear solenoids $11_1$ to $11_4$ so that voltages based on results of calculations performed in the calculating circuits $50_1$ to $50_4$ are supplied to the linear solenoids $11_1$ to $11_4$.

With such controlling circuits, standard braking pressures $P_F$ and $P_R$ for front and rear wheels are determined corresponding to the reference deceleration $G_o$ which has been set in dependence on the brake pedal depressing force and voltages $V_{F1}$, $V_{F2}$, $V_{R3}$ and $V_{R4}$ corresponding to the standard braking pressure $P_F$ and $P_R$ are applied to the linear solenoids $11_1$ to $11_4$. This makes it possible to realize ideal braking distribution and provide the maximum braking efficiency.

Additionally, it is assured that an effectiveness of braking operation can be stabilized by detecting a deceleration G, calculating a difference between the detected deceleration G and the reference deceleration $G_o$ which has been set relative to the brake pedal depressing force and then compensating a voltage to be applied to the respective linear solenoids $11_1$ to $11_4$ in dependence on the calculated difference. Specifically, when an output from the comparison circuit 38 remains at a high level (as represented by an inequality of $G_o > G + \epsilon$), a braking force for one of the braking units $B_1$ to $B_4$ corresponding to a wheel running at the highest speed is increased and when an output from the comparison circuit 39 remains at a high level (as represented by an inequality of $G_o < G + \epsilon$), a braking force for one of the braking units $B_1$ to $B_4$ corresponding to a wheel running at the lowest speed is reduced. Thus, even if a frictional coefficient of the brake pad for the respective braking units $B_1$ to $B_4$ is reduced, an effectiveness of braking operation related to the brake pedal depressing force is left unchanged and a stable effectiveness of braking operation is assured. Further, since hydraulic braking pressure is controlled such that right and left wheel speeds, i.e., slip rates become equal even when a braking force imparted to each of the left wheels is not equally balanced with that of the right wheels, losing control of a steering wheel due to a braking force applied to only one side of the wheels can be prevented.

Indeed, there is no need of providing any special actuator for the purpose of anti-lock controlling and moreover it is possible to perform anti-lock controlling merely by controlling the voltage to be applied to the linear solenoids $11_1$ to $11_4$. This assures that a phenomenon of kick-back does not appear during anti-lock operation.

Further a control circuit for controlling the driving force of the vehicle by brakes can easily be added.

Figure 10:
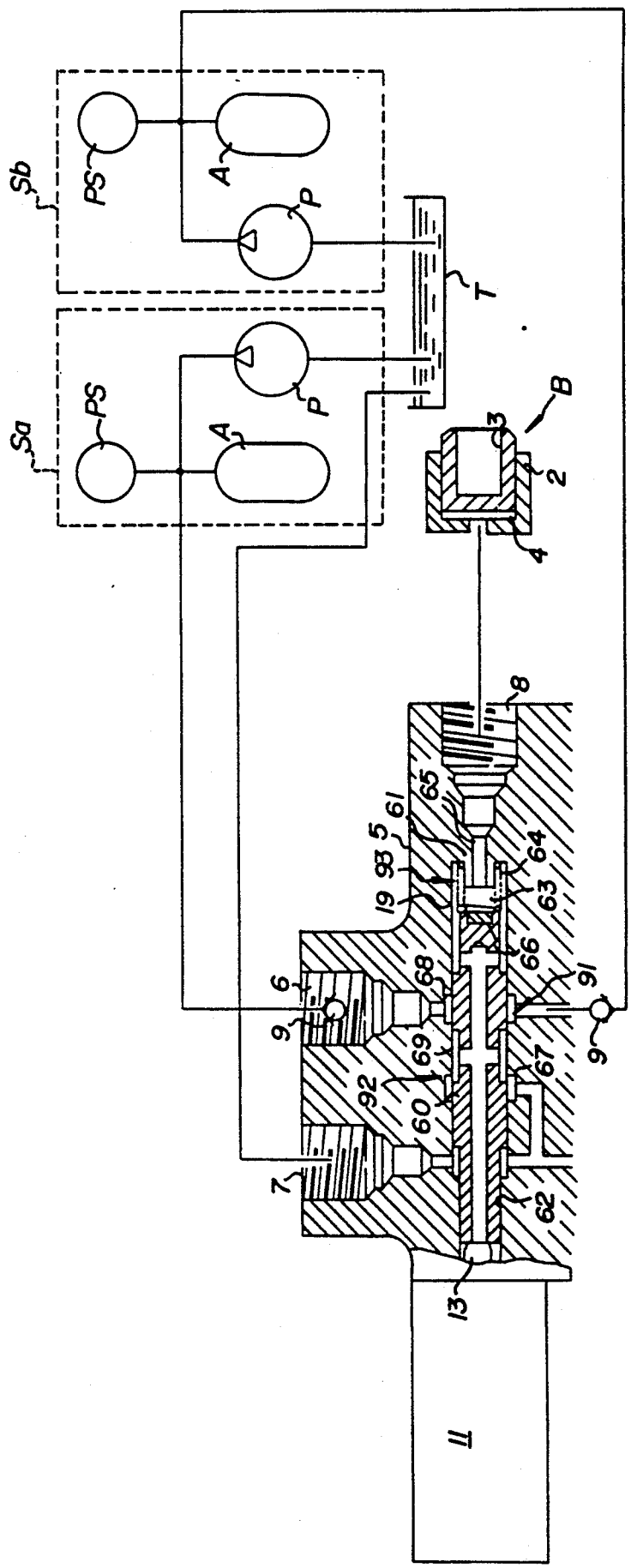
FIG. 10 is a vertical sectional view of an apparatus in accordance with a second embodiment of the present invention, particularly illustrating an essential part thereof.

Next, FIG. 10 is a vertical sectional view of an essential part a second embodiment of the present invention. Same parts or components as those in the first embodiment are identified by the same reference numerals and characters.

Axially slidably fitted in the housing 5 is a spool 60 which is biased by means of the linear solenoid 11 toward the hydraulic pressure supplying position side where an output port 8 is communicated with an input port 6, and which is biased by hydraulic braking pressure in a brake unit B toward the hydraulic pressure releasing position side where the output port 8 is communicated with a release port 7. Specifically, the housing 5 is formed with a cylinder bore 62 located coaxially relative to the linear solenoid 11 and the output port 8 and a partition portion 61 is interposed between the output port 8 and the cylinder bore 62. The spool 60 is slidably fitted in the cylinder bore 62 while its one end comes in contact with a driving rod 13 of the linear solenoid 11. A hydraulic pressure chamber 63 is defined between the other end of the spool 60 and the partition portion 61, in which a return spring 19 is accommodated so as to allow the spool 60 to be biased toward the linear solenoid 11 side by its resilient force so that the one end of the spool 60 is normally brought in contact with the driving rod 13.

In addition, a cylindrical protrusion 64 is coaxially protruded from the partition portion 61 toward the hydraulic pressure chamber 63 side and a communication hole 65 through which the hydraulic pressure chamber 63 is communicated with the output port 8 is formed in the protrusion 64. A valve member 66 is secured to the other end of the spool 60 so as to close the communication hole 65 by causing the valve member 66 to contact the foremost end of the protrusion 64 when some hydraulic failure or trouble takes place in a region extending from the output port 8 to the braking unit B. Here, a third valve 93 is constituted by the communication hole 65 and the valve member 66 so that it interrupts communication between the hydraulic chamber 63 and the braking unit B when the spool 60 is displaced to the maximum degree toward the hydraulic pressure chamber 63 side.

An annular recess 67 communicated with the release port 7 and an annular recess 68 offset from the annular recess 67 toward the hydraulic chamber 63 to be communicated with the input port 6 are formed on the inner surface of the cylinder bore 62 in an axially spaced relationship. Additionally, an annular groove 69 normally communicated with the hydraulic chamber 63 is formed on the outer surface of the spool 60. Here, a first valve 91 adapted to change over the connection and disconnection between the input port 6 and the output port 8 is comprised of the annular recess 68 and the annular groove 69, while a second valve 92 adapted to change over the connection and disconnection between the output port 8 and the release port 7 is comprised of the annular recess 67 and the annular groove 69. The spool 60 is axially displaceable between the hydraulic pressure releasing position where the output port 8 is communicated with the release port 7 by permitting the annular groove 69 to be communicated with the annular recess 67 to open the second valve 92 and the hydraulic pressure supplying position where the annular groove 69 is communicated with the annular recess 68 to open the first valve 91. Thrust force given by the linear solenoid 11 acts toward the hydraulic pressure supplying position side, while hydraulic force generated by hydraulic pressure in the hydraulic pressure chamber 63 acts toward the hydraulic pressure releasing position side.

Also in the second embodiment, an intensity of hydraulic pressure in the hydraulic pressure chamber 63, i.e., in the hydraulic braking pressure chamber 4 in the braking unit B is determined by thrust force generated from the linear solenoid 11 in dependence on electric current or voltage applied to the latter whereby the same advantageous effects as in the first embodiment are assured.

Figure 11:
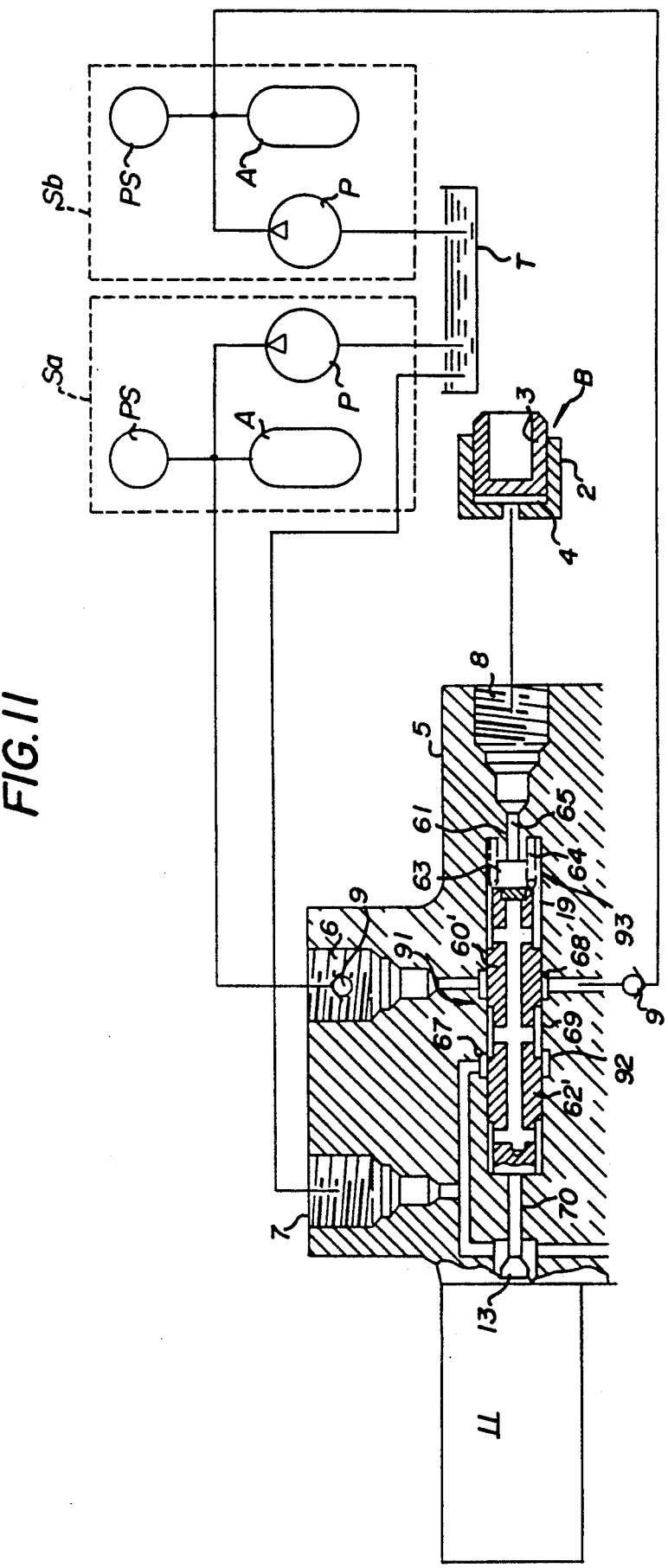
FIG. 11 is a vertical sectional view illustrating a modification of the second embodiment.

FIG. 11 illustrates, by way of example, a modification from the aforementioned second embodiment in which a shaft portion 70 adapted to come in contact with the driving rod 13 of the linear solenoid 11 is connected to the one end of a spool 60' slidably received in the cylinder bore 62' in a coaxial relationship.

Figure 12:
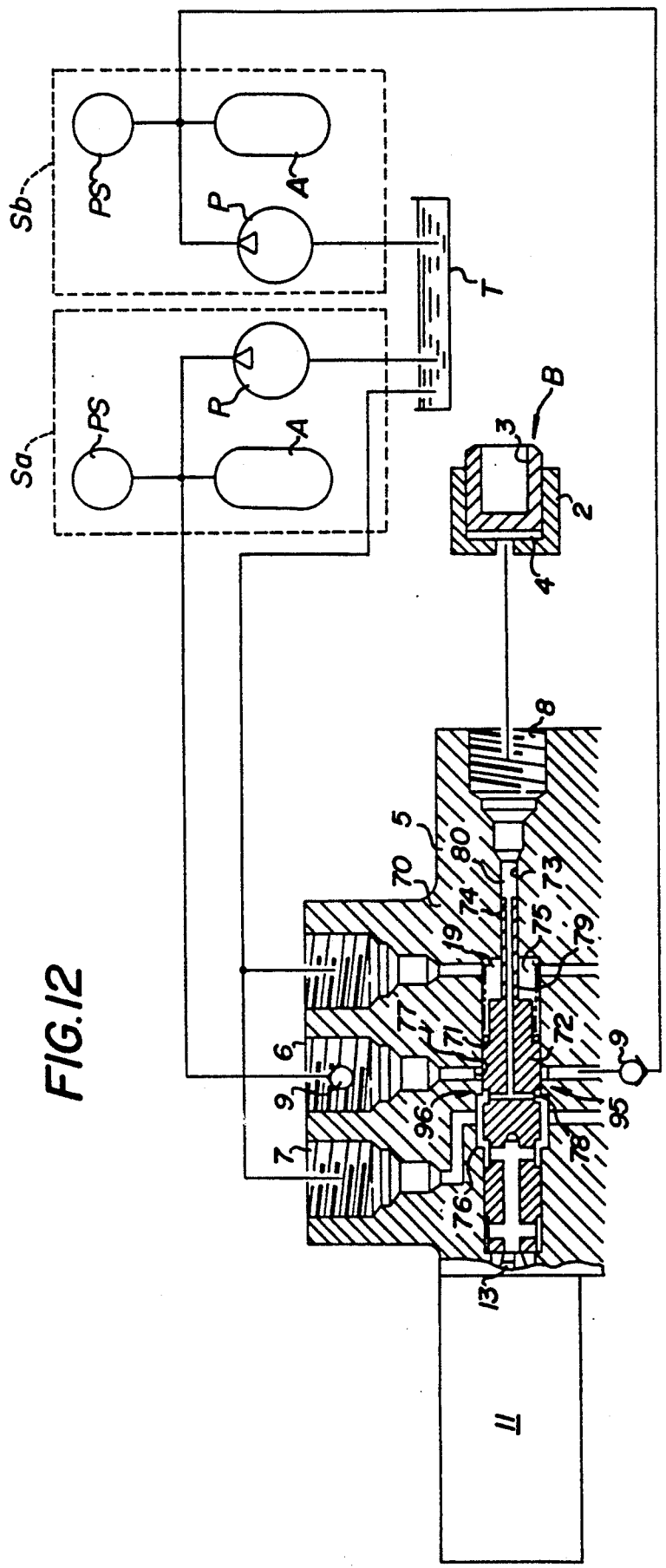
FIG. 12 is a vertical sectional view of an apparatus in accordance with a third embodiment of the present invention, particularly illustrating an essential part thereof.

FIG. 12 shows a third embodiment of the present invention. Same parts or components as those in the foregoing embodiments are identified by the same reference numerals and characters.

The housing 5 is formed with a cylinder bore 71 located coaxially relative to the output port 8 and the linear solenoid 11, and a partition portion 70 is interposed between the output port 8 and the cylinder bore 71. A spool 72 contacting at its one end the driving rod 13 of the linear solenoid 11 is slidably fitted in the cylinder bore 71 and a return spring 19 is accommodated in a spring chamber 75 defined between the other end of the spool 72 and the partition portion 70 to be communicated with the oil tank T so as to bias the spool 72 toward the linear solenoid 11 side. The partition portion 70 is formed with a communication hole 73 by way of which the spring chamber 75 is coaxially connected to the output port 8 and a shaft portion 74 oil-tightly and slidably fitted in the communication hole 73 is coaxially connected to the other end of the spool 72. It should be noted that the communication hole 73 forms a hydraulic pressure chamber 80 exposing to the foremost end of the shaft portion 74.

On the other hand, an annular recess 76 located on the linear solenoid 11 side to be communicated with the release port 7 and an annular recess 77 communicated with the input port 6 are formed on the inner surface of the cylinder bore 71 in an axially spaced relationship, and an annular groove 78 is formed on the outer surface of the spool 72. The annular groove 78 is communicated with the output port 8 via a passage 79 formed in the spool 72 and the hydraulic pressure chamber 80. Here, a first valve 95 adapted to change over the connection and disconnection between the input port 6 and the output port 8 is comprised of the annular recess 77 and the annular groove 78, while a second valve 96 adapted to change over the connection and disconnection between the output port 8 and the release port 7 is comprised of the annular recess 76 and the annular groove 78. With this construction, the spool 72 is biased by thrust force given by the linear solenoid 11 toward the hydraulic pressure supplying position side where the annular groove 78 is communicated with the annular recess 77 to open the first valve 95. Further, while the spool 72 is held at the hydraulic pressure supplying position, it is biased by hydraulic pressure of the hydraulic pressure chamber 80 toward the hydraulic pressure releasing position side where the annular groove 78 is communicated with the annular recess 76 to open the second valve 96.

When some hydraulic failure of trouble takes place in a region extending from the output port 8 to the braking unit B, the annular groove 78 on the spool 72 urged by the linear solenoid 11 is displaced beyond the annular recess 77 toward the partition portion 70 side in response to loss of hydraulic pressure in the hydraulic pressure chamber 80 whereby the communication between the annular recess 77 and the annular groove 78 is interrupted. This assures that braking hydraulic pressure in other braking units is not adversely affected in the event of an occurrence of hydraulic failure or trouble.

Also in the third embodiment, the same advantageous effects as in the foregoing embodiments are assured.

What is claimed is:

1. A method of controlling a hydraulic braking pressure for a vehicle having front and rear wheels, comprising the steps of:
   setting a reference deceleration in dependence on a quantity of braking operation;
   determining a standard hydraulic braking pressure individually for each of said front and rear wheels in a manner corresponding to said reference deceleration to substantially equalize locking points for the front and rear wheels with each other; and
   applying respective amounts of electricity, corresponding to said standard hydraulic braking pressures, to associated actuators which are operable to supply said hydraulic braking pressure to associated braking units in respective amounts dependent on said amounts of electricity applied.

2. A method of controlling a hydraulic braking pressure for a vehicle as claimed in claim 1, further comprising comparing said reference deceleration with a detected deceleration and adjusting the amount of electricity to be applied to each actuator in dependence on a result derived from the comparison.

3. A method of controlling a hydraulic braking pressure for a vehicle as claimed in claim 2, wherein when a result derived from a subtraction of the detected deceleration from the reference deceleration is larger than a first set value which has been previously set, the amount of electricity to be applied to each actuator is adjusted in a direction of increasing a braking force.

4. A method of controlling a hydraulic braking pressure for a vehicle as claimed in claim 3, wherein said actuator is provided for each wheel of said front and rear wheels and a wheel speed is detected individually for the respective wheels, and when a result derived from a subtraction of the detected deceleration from the reference deceleration is larger than the first set value, the amount of electricity to be applied to one actuator corresponding to one wheel having the highest wheel speed is adjusted.

5. A method of controlling a hydraulic braking pressure for a vehicle as claimed in claim 2, wherein when a result derived from a subtraction of the detected deceleration from the reference deceleration is smaller than the first set value and a result derived from a subtraction of the reference deceleration from the detected deceleration is smaller than a second set value which has been previously set, the amount of electricity to be applied to each actuator is maintained so as to maintain said braking hydraulic pressure at a current level.

6. A method of controlling a hydraulic braking pressure for a vehicle as claimed in claim 2, wherein when a result derived from a subtraction of the reference deceleration from the detected deceleration is larger than a second set value which has been previously set, the amount of electricity to be applied to each actuator is adjusted in a direction of moderating a braking force.

7. A method of controlling a hydraulic braking pressure for a vehicle as claimed in claim 6, wherein said actuator is provided for each wheel of said front and rear wheels and a wheel speed is detected individually for the respective wheels, and when a result derived from a subtraction of the reference deceleration from the detected deceleration is larger than the second set value, the amount of electricity to be applied to one actuator corresponding to one wheel having the lowest wheel speed is adjusted.

8. A method of controlling a hydraulic braking pressure for a vehicle as claimed in claim 1, further comprising determining whether or not an anti-lock controlling should be performed for the respective brake units and when determined that anti-lock controlling should be performed, holding the amount of electricity to the associated actuator at a current level and adjusting the amount of electricity thus held by a specified amount of electricity for anti-lock control use calculated in response to a locking tendency, thereby determining the amount of electricity to be applied to the associated actuator.

9. A method of controlling a hydraulic braking pressure for a vehicle having front and rear wheels, comprising the steps of:

setting a reference deceleration in dependence on a quantity of braking operation;

determining a standard hydraulic braking pressure individually for each of said front and rear wheels in a manner corresponding to said reference deceleration to make the standard hydraulic braking pressure on the rear wheel side lower than the standard hydraulic braking pressure on the front wheel side; and applying respective amounts of electricity corresponding to said standard hydraulic braking pressures to associated actuators which are operable to supply said hydraulic braking pressure to associated braking units in respective amounts dependent on said amounts of electricity applied.

10. A method for controlling a hydraulic braking pressure for a vehicle as claimed in claim 9, wherein the standard hydraulic braking pressures for respective front and rear wheels are determined such that the standard hydraulic braking pressure on the rear wheel side is increased at a lower rate than the standard hydraulic braking pressure on the front wheel side with respect to an increase in the reference deceleration.

* * * * *